April 21, 1925.  1,534,645

F. HUBER

MOTOR DRIVEN VEHICLE

Filed April 16, 1924

Fritz Huber
by Wm B. Whitney
attorney

Patented Apr. 21, 1925.

1,534,645

UNITED STATES PATENT OFFICE.

FRITZ HUBER, OF MANNHEIM, GERMANY, ASSIGNOR TO HEINRICH LANZ, OF MANNHEIM, BADEN, GERMANY, A COPARTNERSHIP.

MOTOR-DRIVEN VEHICLE.

Application filed April 16, 1924. Serial No. 706,803.

*To all whom it may concern:*

Be it known that I, FRITZ HUBER, a citizen of Germany, residing in the city of Mannheim, Baden, Germany, have invented certain new and useful Improvements in Motor-Driven Vehicles, of which the following is a specification.

The invention relates to a motor vehicle wherein the chassis frame consists of two parts which are pivotally joined together, and the object thereof is to simplify and otherwise improve the construction of such a frame.

To this end, my improved chassis frame comprises a main frame adapted to carry the motor, which at one end is supported upon one of the axles of the vehicle, usually or preferably the front axle, and at the other end is supported by a supplemental frame member which is joined thereto by a vertically disposed pivotal connection and which in turn is supported upon the other, or rear, axle of the vehicle by a connection permitting of a rotative motion about a horizontally disposed longitudinal axis.

More specifically, that part of my improved chassis frame which carries the motor comprises two frame members or longitudinals which at their forward ends are spaced apart and suitably supported upon the front axle of the vehicle and converging towards their rear ends are there united in a forked joint member, and to this forked member is pivoted, by means of vertically disposed bolts, a second forked joint member which constitutes the second part or extension of the frame and is fixed rotatably to a casing which in turn is attached to the rear axle of the vehicle and contains the differential gear for the drive of the wheels.

Figure 1:
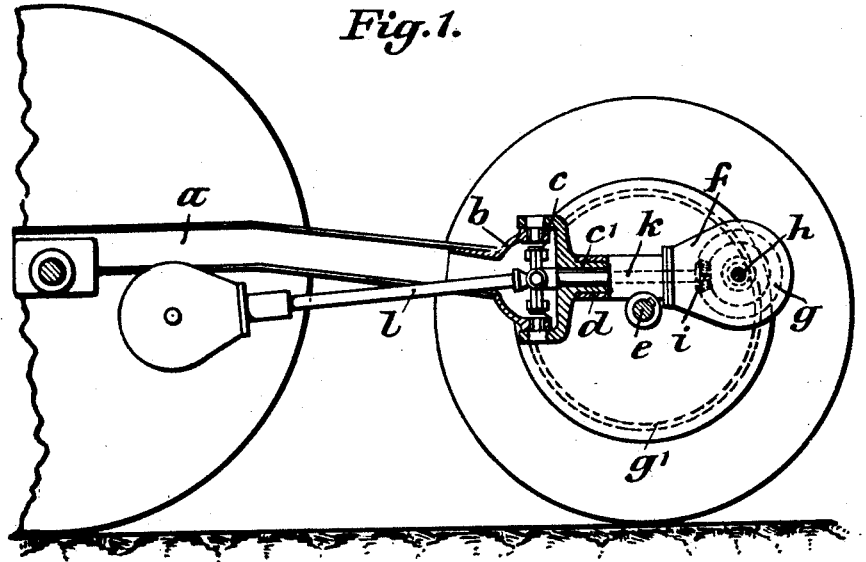
Figure 2:
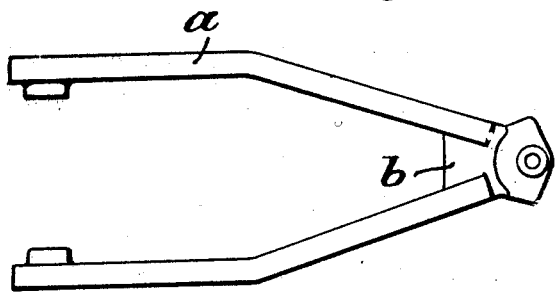

The invention is illustrated schematically in the accompanying drawings, in which Fig. 1 is a vertical longitudinal section taken at the center of the chassis frame, showing the parts some in side elevation and some in section, and Fig. 2 is a detached plan view of the main frame or part which carries the motor.

As here shown, $a$ indicates the frame which supports the motor. This frame consists of two longitudinal members which at their forward ends are suitably supported upon the front axle and after extending parallel for a part of their length are bent inwardly towards each other so that their rear ends, converging at a rather sharp angle, are united to the hollow forked joint member $b$. To this forked joint member $b$ there is pivoted, by means of vertically disposed bolts, a complementary forked joint member $c$ provided with a hollow tubular extension or guide-piece $c^1$ which is secured to and rotates within the sleeve $d$ keyed centrally upon the rear axle $e$ and carrying, rigidly attached to its rear outer end, the casing $f$ for the differential gear $g$.

The drive of the rear wheels from the differential gear is effected in the usual or in any suitable manner—for example, as shown, through shafts $h$, each carrying a pinion which meshes with a crown-wheel $g^1$ on a drive-wheel. The differential gear is in turn driven by a bevel gear $i$ fixed upon the rear end of an articulated shaft $k$ which, passing through the hollow guide-piece $c^1$ in which it is journaled, is connected by a Cardan joint with the drive-shaft $l$, the axial-center of the cardan being laid into the axis of the forked joint $b\ c$.

By the construction illustrated and described I have provided a chassis which is extremely simple and at the same time possesses several features of distinct advantage over all prior constructions. The parts, which are few in number, are simple and hence easy to fabricate and finish, can be quickly assembled without careful adjustments and readily repaired, and are not liable to be disturbed by ordinary rough usage. In particular, the sleeve, with its integral eye-boss, and the differential casing are rigidly united, by flanges which form a dust- and oil-tight joint, and can be handled as a single piece—for instance, the eye in the boss on the sleeve and the holes in the casing for the divided shaft of the differential can be drilled with a double-spindled drill in a single operation and require no subsequent adjustment whatever, and the parts can be mounted as a unit by simply sliding the sleeve upon the dead axle of the driving wheels, usually the rear wheels, and keying it in place thereon. Furthermore, the construction provides a simple and very economical system of lubrication, since the grease with which the differential casing is filled serves to lubricate both the bearings of the shaft within the hollow guide-piece and of the guide-piece within the sleeve.

What I claim as new, and desire to secure by Letters Patent, is—

1. A chassis for a motor vehicle comprising a main frame, adapted to carry the motor, which at one end is mounted upon one axle of the vehicle and at its other end is pivoted centrally, to swing about a vertical axis, to a central longitudinal member which is swiveled within a sleeve fixed directly upon the second axle of the vehicle and carrying rigidly attached to its outer end a casing for the differential.

2. An articulated chassis for a motor vehicle comprising two longitudinal frame members which at their outer ends are spaced apart and supported upon one of the axles of the vehicle and at their other ends converge and are united to a central hollow joint member and, pivoted to said joint member to swing about a vertical axis, a complementary hollow joint member with hollow longitudinal extension which is swiveled within a sleeve carrying rigidly attached to its outer end a differential casing and fixed centrally on and supported directly by the other axle of the vehicle.

3. In a motor-driven vehicle, an articulated chassis comprising a main frame formed by two longitudinal frame members, extending for a part at least of their length at an angle to each other, which are mounted at their spaced outer ends on one axle of the vehicle and at their converging inner ends are united to a hollow forked joint member, and, pivoted to said joint member to swing about a vertical axis, a complementary hollow forked joint member which is swiveled within a longitudinal sleeve fixed centrally upon the other axle of the vehicle and carrying rigidly attached to its outer end a differential casing, and driving means comprising a drive-shaft and a shaft which is journaled within the complementary joint member and at its inner end is joined to the drive-shaft by a universal joint centered at the axis of the frame joint and at its outer end is geared to a differential driving gear within the casing.

Dr. FRITZ HUBER.

Witnesses:
Julius Lintner,
Constantin Gerber.